(12) United States Patent
Weldon

(10) Patent No.: US 10,715,539 B1
(45) Date of Patent: Jul. 14, 2020

(54) REQUEST HEADER ANOMALY DETECTION

(71) Applicant: UIPCO, LLC, San Antonio, TX (US)

(72) Inventor: Duane E. Weldon, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 323 days.

(21) Appl. No.: 15/804,350

(22) Filed: Nov. 6, 2017

Related U.S. Application Data

(60) Provisional application No. 62/418,508, filed on Nov. 7, 2016.

(51) Int. Cl.
*H04L 29/06* (2006.01)

(52) U.S. Cl.
CPC .......... *H04L 63/1425* (2013.01); *H04L 63/10* (2013.01); *H04L 63/1441* (2013.01)

(58) Field of Classification Search
CPC .. H04L 63/1425; H04L 63/1441; H04L 63/10
USPC ........................................................ 726/23
See application file for complete search history.

(56) References Cited

U.S. PATENT DOCUMENTS

| | | | | |
|---|---|---|---|---|
| 7,624,084 B2* | 11/2009 | Chesla | ................. | H04L 63/168 706/46 |
| 8,949,978 B1* | 2/2015 | Lin | ......................... | G06F 21/51 726/12 |
| 2001/0043217 A1* | 11/2001 | Maloney | ................. | H04L 41/12 345/473 |
| 2001/0049795 A1* | 12/2001 | Elgressy | ............... | H04L 63/102 726/26 |
| 2003/0046316 A1* | 3/2003 | Gergic | ................... | G06F 9/451 715/234 |
| 2003/0115281 A1* | 6/2003 | McHenry | ................ | H04L 29/06 709/213 |
| 2005/0187890 A1* | 8/2005 | Sullivan | .................. | H04L 29/06 |
| 2007/0083655 A1* | 4/2007 | Pedersen | ............... | H04L 63/102 709/226 |
| 2007/0107053 A1* | 5/2007 | Shraim | ................ | G06Q 10/107 726/22 |
| 2007/0214503 A1* | 9/2007 | Shulman | ............. | G06F 11/2257 726/22 |
| 2008/0086434 A1* | 4/2008 | Chesla | ................... | G06N 5/048 706/12 |
| 2008/0222717 A1* | 9/2008 | Rothstein | ............ | H04L 63/1416 726/14 |
| 2009/0007021 A1* | 1/2009 | Hayton | ..................... | G06F 8/34 715/843 |
| 2014/0250526 A1* | 9/2014 | Khanna | ................. | G06F 21/552 726/22 |
| 2016/0112440 A1* | 4/2016 | Kolton | .................. | G06F 21/567 726/1 |

(Continued)

OTHER PUBLICATIONS

Fielding, Roy, et al. "RFC 2616: Hypertext transfer protocol—HTTP/1.1." (1999). (Year: 1999).*

(Continued)

*Primary Examiner* — Syed A Zaidi
(74) *Attorney, Agent, or Firm* — Greensfelder, Hemker & Gale, P.C.; Joseph A. Fuch

(57) ABSTRACT

A system and a method are disclosed for detecting an unacceptable HTTP requests by scanning the headers of the HTTP requests.

13 Claims, 3 Drawing Sheets

(56) References Cited

U.S. PATENT DOCUMENTS

2016/0182454 A1* 6/2016 Phonsa .............. H04L 63/0263
                                                    726/11
2017/0149810 A1* 5/2017 Keshet ............... H04L 63/1425
2017/0171104 A1* 6/2017 Zhou .................... H04L 63/102

OTHER PUBLICATIONS

Abgrall, Erwan, et al. "XSS-FP Browser fingerprinting using HTML parser quirks." arXiv preprint arXiv:1211.4812 (2012). (Year: 2012).*
Unger, Thomas, et al. "Shpf Enhancing http (s) session security with browser fingerprinting." 2013 International Conference on Availability, Reliability and Security. IEEE, 2013 (Year: 2013).*
NPL Searc Results.*
NPL Search Results (Year: 2020).*

* cited by examiner

REQUEST HEADER ANOMALY DETECTION

CROSS-REFERENCE TO RELATED APPLICATIONS

The present application claims the benefit of the filing date of U.S. Provisional Patent Application Ser. No. 62/418,508 filed Nov. 7, 2016, and is incorporated herein by reference.

FEDERALLY SPONSORED RESEARCH OR DEVELOPMENT

N/A

FIELD OF THE INVENTION

A method of identifying fraud (along with information security threats) based solely on header attributes of incoming HTTP requests.

DESCRIPTION OF THE PRIOR ART

There are numerous software products to detect fraudulent activity by fraudsters on a commercial website. However, there are no products known by the inventor that scan through incoming HTTP request headers for anomalies to detect potential fraudulent activity. All browsers send certain bits of information when connecting to the commercial website. Per the RFC, the order of the headers is not mandated and thus each browser (i.e., Internet Explorer, Firefox, Chrome, Opera, Netscape, Safari, etc.) send these bits of information according to their own designs. And each browser has its own unique "signature" of what "should" be in the headers and even the order of the headers. The present invention provides a system and method to recognize a good header from a bad header. A bad header can be one which has been altered manually by a fraudster or unwittingly by the fraudster's tools—leaving the fraudster unaware of the tell-tale signs left behind in the form of anomalies in the HTTP request headers. By detecting fraud at the very start of the connection, without having to wait for the fraudster to attempt malicious acts, such activity can be curtailed.

SUMMARY OF THE INVENTION

The present invention provides a method for detecting suspicious clients seeking access to a website including the steps of providing a web server supporting the website electronically connected to the Internet. The web server responds to incoming HTTP requests for webpages of the website from clients attempting to access the website. The web server receives a plurality of incoming HTTP request headers from a browser of a client. The plurality of incoming HTTP request headers are displayed in an order of appearance from top to bottom. At least one of the incoming HTTP request headers identifies the client browser type. Searching the incoming HTTP request headers with the web server to determine the browser type used by the client. The method further requires providing an example of a correct set of HTTP request headers for the client browser and comparing the incoming HTTP request headers with the correct set of HTTP request headers to detect an anomaly in the incoming HTTP request headers. Upon detecting an anomaly a prescribed action can be taken such as disallowing the client access to the website.

BRIEF DESCRIPTION OF THE DRAWINGS

To understand the present invention, it will now be described by way of example, with reference to the accompanying drawings and attachments in which.

DETAILED DESCRIPTION

Figure 1:
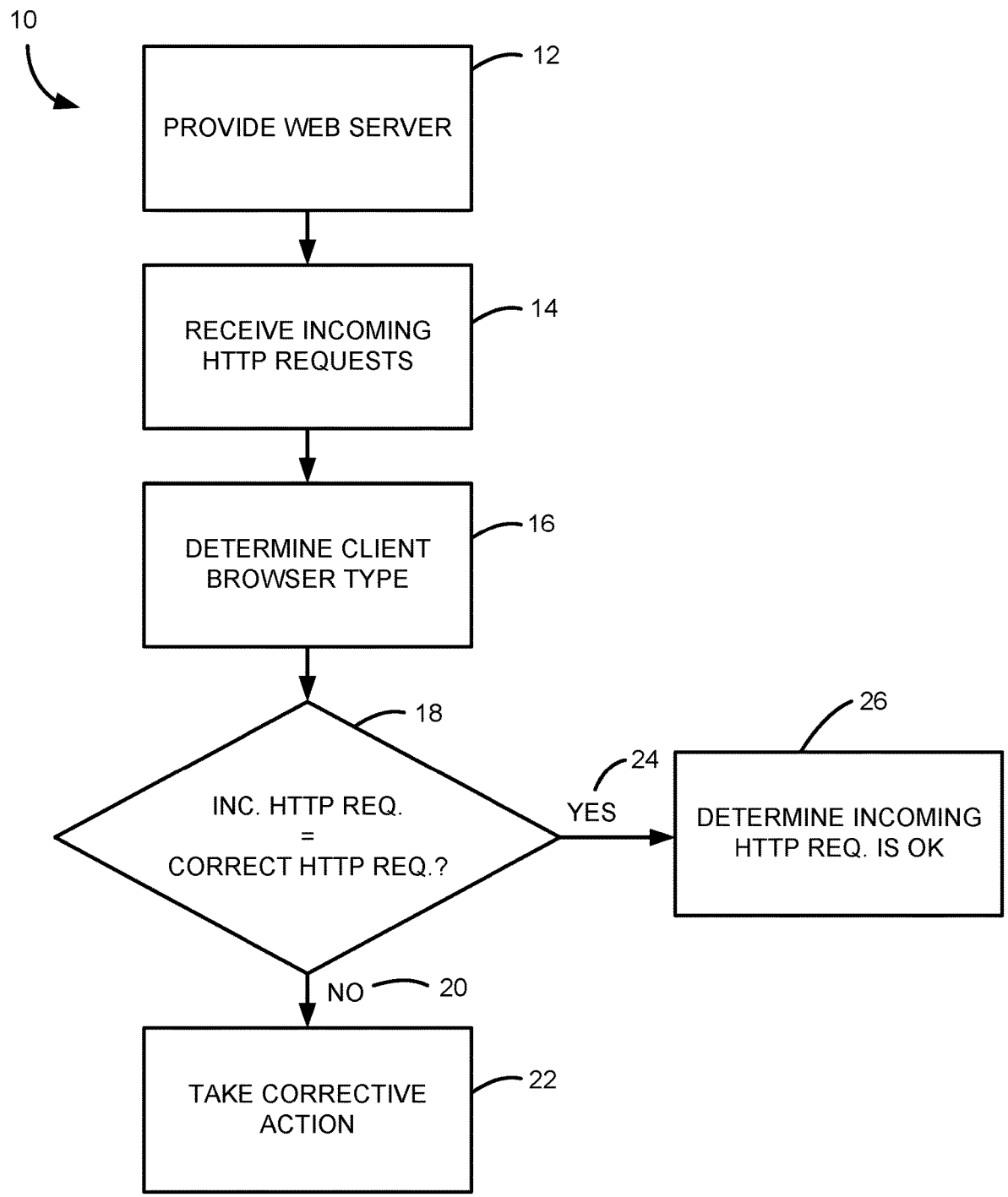
FIG. 1 is a flowchart of a method of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a system (FIG. 3) and a method for detecting suspicious clients seeking access to a website. The method shown in FIG. 1 is carried out using a server (FIG. 2) with a processor and memory for storing machine readable instructions when executed by the processor carry out the method.

Generally speaking, the method of FIG. 1 is aimed at detecting mistakes in headers accompanying HTTP requests for access to a website from a customer 302. Such mistakes can occur, for example, when a client/fraudster wants to disguise their true identity and gain access to a website for malicious purposes. If the disguise is unartfully implemented the incoming header will deviate from what it should be and the impostor will be detected. Suitable action can then be taken such as denying the fraudster access to the website. More specifically, for example, if an incoming HTTP request identifies itself as a CHROME browser in a USER_AGENT header but uses a q=0.5 value in a ACCEPT_LANGUAGE header, which indicates a FIREFOX browser, then an anomaly is detected and corrective action can be taken.

The method requires identifying a signature or correct version of an HTTP request for each type of web browser and to use these correct versions to compare to incoming HTTP request to determine if it matches the correct version. Each web browser has its own signature manner in handling HTTP request headers. Web browsers include, for example, Internet Explorer, FIREFOX, OPERA, CHROME, MOZILLA, NETSCAPE, SAFARI, and others. The present method includes determining for each of these web browsers a correct order of appearance of the headers in a HTTP request and the correct content of each of the headers to define a correct HTTP request.

HTTP request headers are numerous, but for the purpose of this disclosure we will limit the discussion in the most part to the following seven: ACCEPT, ACCEPT_ENCODING, ACCEPT_LANGUAGE, CONNECTION, HOST, REFERER, and USER_AGENT. The ACCEPT header specifies the content types that are acceptable for the response such as: text/html,application/shtml+xml,application/xml; q=0.9, image/webp,*/*;q=0.8.

The ACCEPT_ENCODING header specifies whether the client browser can accept encodings such as gzip and deflate. The ACCEPT_LANGUAGE is a list of acceptable human languages for the client browser. The CONNECTION header list acceptable control options for the current connection and list of hop-by-hop request fields and includes keep-alive and upgrade. The HOST header contains the domain name for virtual hosting. The REFERRER header contains the address of the previous web page from which a link to the currently requested page was followed.

The USER_AGENT header specifies the browser version and operating system of the client browser. Thus, by scanning the USER_AGENT header at the web server, the client browser type can be determined. The method includes comparing the signature or correct version of the HTTP response headers for the client browser with the actual content of the incoming HTTP response headers.

Some ripe areas for detecting anomalies are in the ACCEPT and the ACCEPT_LANGUAGE headers. For example, the CHROME browser should have "webp" in ACCEPT and q=0.8 in ACCEPT_LANGUAGE header. Also, CHROME includes a header peculiar to it called UPGRADE_INSECURE_REQUESTS. This changes HTTP to HTTPS. The FIREFOX browser should have q=0.5 in the ACCEPT_LANGUAGE header.

The order the headers appear can also be a signature attribute of a correct HTTP request. For example, a correct FIREFOX HTTP request has the USER_AGENT header first while INTERNET EXPLORER has the ACCEPT header first.

Now with reference to FIG. 1 a method 10 includes numerous steps that do not necessarily have to be executed in the recited order. Step 12 includes providing a web server 306 supporting or implementing the website having a plurality of webpages. The server 306 is electronically connected to the Internet 304 for interacting with clients 302 seeking to gain access to the website. In step 14, the web server 306 receives a plurality of incoming HTTP request headers from a browser of a client 302. The plurality of incoming HTTP request headers are in an order of appearance from top to bottom, at least one of the incoming HTTP request headers identifies the client browser type.

In step 16 the web server scans the incoming HTTP request to determine the type of browser used by the client, and more particularly the web server scans the USER_AGENT header discussed above. In one form of the invention the web server will utilize a HTTP header checker module 310 of FIG. 3. In step 18 the web server compares the incoming HTTP request with the signature or correct HTTP request. If the two are not equal 20 then corrective action can be taken in step 22. If, however, the two are equal 24 then the incoming HTTP request is deemed to be acceptable. Corrective action typically includes denying the client access to the website.

Figure 2:
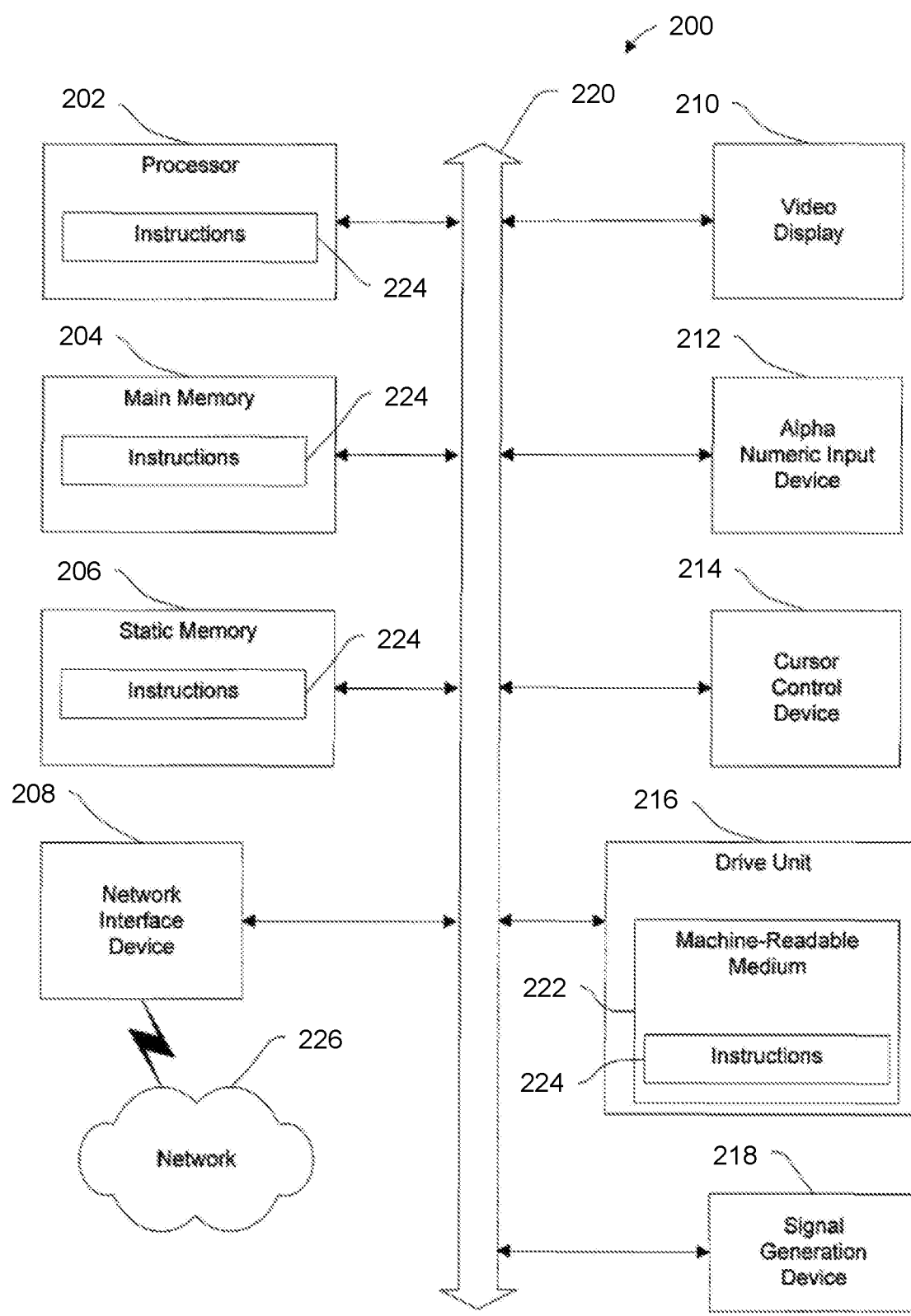
FIG. 2 is a diagrammatic representation of a computer system for carrying out the method of FIG. 1.

FIG. 2 is a diagrammatic representation of a machine 200 in an example form of a computer system within which a set of instructions, for causing the machine to perform the methodologies discussed herein, may be executed. In alternative embodiments, the machine may operate as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with reference to FIG. 2, the example computer system 200 includes a processor 202 (e.g., a central processing unit (CPU), a graphics processing unit (GPU) or both), a main memory 204 and a static memory 206, which communicate with each other via a bus 220. The computer system 200 may further include a video display unit 210 (e.g., a liquid crystal display (LCD) or a cathode ray tube (CRT)). The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 208.

Still further with reference to FIG. 2, the disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media. The software 224 may further be transmitted or received over a network 226 via the network interface device 208 utilizing any one of a number of well-known transfer protocols (e.g., HTTP).

Lastly with reference to FIG. 2, while the machine-readable medium 222 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Figure 3:
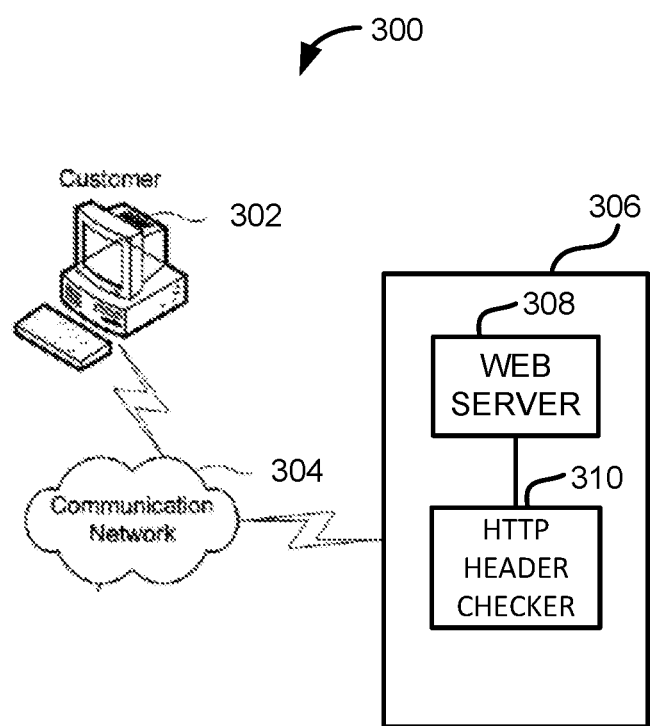
FIG. 3 is a high-level block diagram of an on-line system of a merchant server for interacting with customers and detecting fraudulent activity.

FIG. 3 shows a system 300 for detecting errors in HTTP headers in accordance with the method described with respect to FIG. 1. The system has a user or customer computer 302, a communication network 304, a merchant server 306 having a web server 308 and an HTTP header checker 310. The customer computer 302 can be any device for electronically communicating with the electronic network 304 and includes cell phones, personal computers and the like. The communication network 304 can be an electronic network such as the Internet, world wide web, and the like. The web server 308 can be as described with respect to FIG. 2. The HTTP header checker 310 is a module for carrying out the method of FIG. 1 and upon finding anomalies in HTTP headers to take corrective action such as terminating the user's 302 connection with the merchant server 306.

Many modifications and variations of the present invention are possible in light of the above teachings. It is, therefore, to be understood within the scope of the appended claims the invention may be protected otherwise than as specifically described.

I claim:

1. A method for detecting suspicious clients seeking access to a website comprising:
   providing a web server supporting the website electronically connected to the Internet for responding to incoming HTTP requests for webpages of the website from clients attempting to access the website;
   receiving at the web server a plurality of incoming HTTP request headers from a browser of a client, the plurality of incoming HTTP request headers are in an order of appearance from top to bottom, at least one of the incoming HTTP request headers identify the client browser type and another identifying a q value;
   searching the incoming HTTP request headers to determine the browser type used by the client;
   determining an order of appearance of HTTP request headers from top to bottom of the client browser;
   determining a q value identified in an HTTP request header of the client browser;
   providing an example of a correct set of HTTP request headers for the client browser type having the HTTP request headers in a correct order of appearance from top to bottom and having an HTTP request header having a correct q type;
   comparing the order of appearance of the incoming HTTP request headers of the client browser with the correct order of appearance and if in a different order of appearance an anomaly is detected in the client browser;
   comparing the q value of the client browser type with the correct q type and if a difference is found an anomaly is detected in the client browser; and,
   upon finding an anomaly, denying the client access to the website.

2. The method of claim 1 wherein the plurality of HTTP request headers include ACCEPT, ACCEPT_ENCODING, ACCEPT_LANGUAGE, CONNECTION, HOST, REFERER, UPGRADE_INSECURE_REQUESTS, and USER_AGENT.

3. The method of claim 2 wherein there are a plurality of browser type including Internet Explorer, FIREFOX, OPERA, CHROME, MOZILLA, NETSCAPE, SAFARI, and others.

4. The method of claim 2 wherein the HTTP request header ACCEPT includes the q value.

5. The method of claim 4 wherein the client browser type is identified in the USER_AGENT HTTP header.

6. A system for detecting suspicious clients seeking access to a website comprising:
   providing a server for receiving communications from a user over an electronic network, the server having a processor and a memory storing software instructions when executed by the processor performs the following steps:
   providing a web server supporting a website electronically connected to the Internet for responding to incoming HTTP requests for webpages of the website from clients attempting to access the website;
   receiving at the web server a plurality of incoming HTTP request headers from a browser of a client, the plurality of incoming HTTP request headers are in an order of appearance from top to bottom, at least one of the incoming HTTP request headers identify the client browser type and another identifying a q value;
   searching the incoming HTTP request headers to determine the browser type used by the client;
   determining an order of appearance of HTTP request headers from top to bottom of the client browser;
   determining a q value identified in an HTTP request header of the client browser;
   providing an example of a correct set of HTTP request headers for the client browser;
   comparing the order of appearance of the incoming HTTP request headers of the client browser with the correct order of appearance and if in a different order of appearance an anomaly is detected in the client browser;
   comparing the q value of the client browser type with the correct q type and if a difference is found an anomaly is detected in the client browser; and,
   upon finding an anomaly, denying the client access to the website.

7. The system of claim 6 wherein the plurality of HTTP request headers include ACCEPT, ACCEPT_ENCODING, ACCEPT_LANGUAGE, CONNECTION, HOST, REFERER, UPGRADE_INSECURE_REQUESTS, and USER_AGENT.

8. The system of claim 7 wherein there are a plurality of browser type including Internet Explorer, FIREFOX, OPERA, CHROME, MOZILLA, NETSCAPE, SAFARI, and others.

9. The system of claim 8 wherein the HTTP request header ACCEPT includes the q value.

10. The system of claim 9 wherein the client browser type is identified in the USER_AGENT HTTP header.

11. A non-transitory machine-readable set of instructions stored on a medium for detecting suspicious clients seeking access to a website when executed by a processor perform the steps comprising:
   providing a server for receiving communications from a user over an electronic network, the server having a processor and a memory storing software instructions when executed by the processor performs the following steps:
   providing a web server supporting a website electronically connected to the Internet for responding to incoming HTTP requests for webpages of the website from clients attempting to access the website;
   receiving at the web server a plurality of incoming HTTP request headers from a browser of a client, the plurality of incoming HTTP request headers are in an order of appearance from top to bottom, at least one of the incoming HTTP request headers identify the client browser type and another identifying a q value;
   searching the incoming HTTP request headers to determine the browser type used by the client;
   determining an order of appearance of HTTP request headers from top to bottom of the client browser;
   determining a q value identified in an HTTP request header of the client browser;

providing an example of a correct set of HTTP request headers for the client browser;

comparing the order of appearance of the incoming HTTP request headers of the client browser with the correct order of appearance and if in a different order of appearance an anomaly is detected in the client browser;

comparing the q value of the client browser type with the correct q type and if a difference is found an anomaly is detected in the client browser; and, upon finding an anomaly, denying the client access to the website.

12. The medium of claim 11 wherein the plurality of HTTP request headers include ACCEPT, ACCEPT_ENCODING, ACCEPT_LANGUAGE, CONNECTION, HOST, REFERER, UPGRADE_INSECURE_REQUESTS, and USER_AGENT.

13. The medium of claim 12 wherein there are a plurality of browser type including Internet Explorer, FIREFOX, OPERA, CHROME, MOZILLA, NETSCAPE, SAFARI, and others.

* * * * *